Oct. 17, 1939.    A. T. SWEET ET AL    2,176,776
PROCESS OF OBTAINING MANGANESE VALUES FROM ORES CONTAINING THEM
Filed Sept. 23, 1929
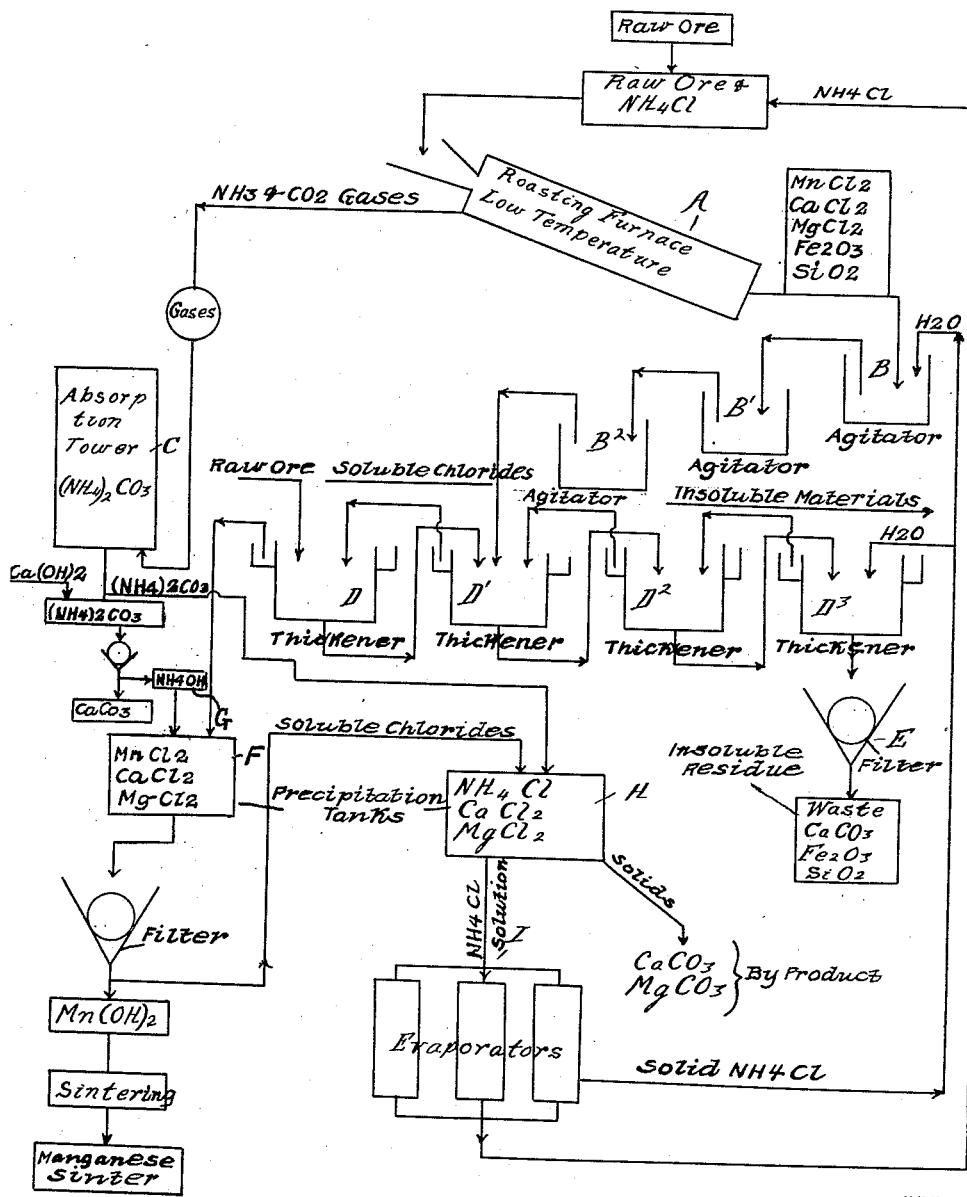
INVENTORS
Andrew T. Sweet
John D. MacCarthy
BY
Whittemore Hulbert
Whittemore Belknap
ATTORNEYS Patented Oct. 17, 1939

2,176,776

UNITED STATES PATENT OFFICE 2,176,776

PROCESS OF OBTAINING MANGANESE VALUES FROM ORES CONTAINING THEM

Andrew T. Sweet, Houghton, and John D. MacCarthy, Detroit, Mich., assignors to General Manganese Corporation, Detroit, Mich., a corporation of Delaware Application September 23, 1929, Serial No. 394,678

12 Claims. (Cl. 23—145)

The invention relates to the extraction of metals from ores and has for its object the obtaining of a process applicable to the economical treatment of relatively low grade ores containing various metals in the form of oxides, carbonates or other insoluble compounds. The invention consists in the novel method of converting these insoluble compounds into soluble compounds, thereby permitting of separation from the gangue by leaching. The invention further consists in various features of the process as hereinafter set forth.

While our improved process is applicable to the treatment of various ores containing different metals and in different chemical compounds, we will specifically describe its application to the treatment of a manganese ore such as one of the following analysis:

| | | Percent |
|---|---|---|
| Dried 212° | Mn | 16.00 |
| | Fe | 11.00 |
| | P | .429 |
| | $SiO_2$ | 13.00 |
| | MgO | 1.80 |
| | CaO | 15.00 |
| | $Al_2O_3$ | 2.70 |
| | $CO_2$ loss | 26.00 |

Essentially our improved process consists in roasting the ore with a reagent having a gaseous base such as ammonium salts. During such roasting a chemical reaction takes place in which the gaseous base or ammonia is liberated and the acid radical of the reagent combines with the various metals to form soluble compounds. Thus with the specific ore above mentioned the metallic compounds are originally in the form of carbonates and during the reaction accompanying the roasting process the carbon dioxide will be displaced passing off with the ammonia or other gaseous base and combining therewith to form a new chemical compound. This compound or derivatives thereof may be subsequently used for precipitataing the metals from their soluble compounds, these having been first separated from the gangue by leaching. The gangue in this instance comprises by analysis the P, $SiO_2$ and $Al_2O_3$ as noted in the above ore analysis. These constituents are in the form of insoluble compounds of the class comprising silica, silicates, alumina and phosphates.

The accompanying drawing diagrammatically represents a flow sheet in the carrying out of our specific process, which process is as follows:

The wet or dry, preferably wet, mixture of ammonium chloride and ore is charged into the roasting furnace. When sufficiently heated so that the moisture begins to form steam the chemical reaction is started. There is first discharged ammonia gas followed by a mixture of ammonia and carbon dioxide fumes which at cooler temperatures unite to form ammonium carbonate. At the same time the acid radical which has displaced carbon dioxide unites with the metal bases to form chlorides. Thus with ore of the specific analysis above given there will be formed iron chloride, manganese chloride, magnesium chloride and calcium chloride. By carefully controlling the temperature in the furnace the iron chloride formed at one point will at another point at higher temperature be decomposed forming iron oxide with the liberation of the acid radical. Preferably the temperature does not exceed 700 degrees Fahrenheit which is sufficient to decompose the iron chloride without decomposition of the manganese chloride. In the decomposition of iron chloride, the chloride ion recombines with the ammonia or with other bases, leaving the iron in insoluble form.

Referring to the flow sheet, A represents the roasting furnace in which the above described reaction takes place. The material discharged from the furnace passes to agitators B, B', B² where it is commingled with water and the soluble salts leached out. The gases from the furnace are passed to an absorption tower C where the ammonia and carbon dioxide unite to form ammonium carbonate $(NH_4)_2CO_3$.

From the agitators B, B', B² the material passes to the separators or thickeners D, D', D², D³ in which the solids are passed through the series in one direction and to the filter E, while the liquid is passed in the opposite direction to the tank F. In case any iron chloride remains after the furnace treatment, this may be eliminated during the leaching treatment by the introduction of sufficient quantity of raw ore to precipitate the iron from the iron chloride as iron hydroxide, the acid radical attacking other metal carbonates with the formation of additional manganese chloride, magnesium chloride and calcium chloride.

The next step in the process is that of precipitating the desired metal compound and/or the separation or differential precipitation of the desired metal compounds, which procedure depends entirely upon the elements present, their respective quantities, and their respective solubilities or insolubilities, as they might occur in the ore being treated. For example, in the processing of the ores cited above the following procedure would be preferable as has been outlined on the accompanying flow sheet. The pregnant liquor which passes to the tank F is then treated by ammonium hydroxide from the tank G. The ammonium hydroxide is derived from a portion of the ammonium carbonate in any suitable manner such as by treating the ammonium carbonate solution with calcium oxide. This results in precipitating the manganese as hydroxide while leaving the magnesium and calcium chloride still in solution. The latter are passed to H where they are treated with ammonium carbonate precipitating the magnesium and calcium carbonate. The several precipitations also result in the formation of ammonium chloride and the solution containing this material is conducted to evaporators I where the original reagent is recovered and may be used again in the roasting furnace.

While the above procedure is preferable in treating the ores specifically used for an example of the process, it is within the scope of the invention to treat other manganese ores containing the same or other associated minerals present in the same quantities or present in variable quantities, or as less soluble compounds, or as insoluble compounds. It is obvious at once that minor changes in the manner and methods of precipitation are necessary to precipitate the desired metal compounds or to effect a differential precipitation as desired.

As a further example of this feature, in an ore containing magnesium and lime as insolubles, or as solubles in small quantities, or one containing no magnesium and lime at all, the flow sheet would be simplified in that the soluble manganese salts containing some, or no other soluble salts would be treated with an ammonium compound derived from at least one of the said gases in a single precipitation step. In this case the manganese compound is precipitated along with or without such quantities of magnesium compounds and other associated compounds present in the particular ore as soluble constituents. The single precipitation thereby reforms the ammonium salt. Other deviations made necessary through the use of ammonium sulphate as the reagent instead of ammonium chloride due to the variation in the different solubilities of the metal sulphate compounds may be had by reference to our co-pending application, Serial No. 394,676, filed September 23, 1929.

It should be noted that when the process is applied to manganese oxide ores containing little or no carbonates, it is obvious that the only gases evolved during the roasting operation are ammonia gases; consequently when treating the soluble manganese salt solution with ammonia only, the manganese is normally precipitated as the hydroxide.

What we claim as our invention is:

1. The process of extracting manganese compounds from carbonate ore containing manganese, iron, magnesium and calcium compounds which comprises roasting the ore with ammonium chloride to convert the manganese, magnesium and calcium compounds into soluble chlorides resulting in the liberation of carbon dioxide and ammonia gases, controlling the temperature in the furnace to decompose any iron chloride which may have been formed into iron oxide with the liberation of the chloride radical to combine with the manganese, magnesium or calcium carbonates, combining the liberated gases to form ammonium carbonate, separating the soluble chlorides of manganese, calcium and magnesium from the insoluble iron compounds, precipitating manganese hydroxide from said soluble chlorides by ammonium hydroxide obtained from said ammonium carbonate, leaving a filtrate containing the chlorides of calcium, magnesium and ammonium, adding ammonium carbonate to said filtrate thereby precipitating the carbonates of calcium and magnesium and leaving a filtrate of ammonium chloride, and utilizing said ammonium chloride to repeat the cycle.

2. The process of recovering manganese compounds from ores containing manganese carbonates which comprises roasting the ore with ammonium chloride to form soluble manganese chloride, resulting in the evolution of ammonia and carbon dioxide gases, separating the soluble manganese chloride from the insoluble residue, precipitating from the solution a manganese compound with an ammonium compound derived from at least one of the said gases capable of forming an insoluble manganese compound and reforming the ammonium chloride in solution and separating and evaporating said solution to recover the ammonium chloride in the original state in order to repeat the cycle.

3. The process of recovering manganese compounds from ores containing manganese oxides and other soluble and insoluble compounds which comprises roasting the ore with ammonium chloride to form soluble manganese chloride, resulting in the evolution of ammonia gas, separating the soluble manganese chloride from the insoluble residue, precipitating from the solution an insoluble manganese compound with an ammonium compound derived from the said ammonia gas thereby reforming the ammonium chloride in solution and separating and evaporating said solution to recover the ammonium chloride in the original state in order to repeat the cycle.

4. The process of recovering manganese compounds from ores containing manganese carbonates, iron and alkaline earth metal compounds and insoluble compounds of the class consisting of phosphates, silica and alumina, which comprises roasting the ore with ammonium chloride to form the soluble chlorides of manganese, iron and the alkaline earth metals, resulting in the evolution of ammonia and carbon dioxide gases, controlling the temperature in the furnace to decompose the soluble iron compound into the insoluble oxide, separating the soluble chlorides of manganese, and alkaline earth metals from the insoluble residue, precipitating insoluble manganese hydroxide from the solution with ammonium hydroxide derived from the said ammonia gases thereby reforming ammonium chloride, separating and treating the soluble alkaline earth metal and ammonium chloride with ammonium carbonate derived from the said ammonia and carbon dioxide gases to form insoluble alkaline earth metal carbonates and to reform ammonium chloride in solution and separating and evaporating said solution to recover the ammonium chloride in the original state in order to repeat the cycle.

5. The process of beneficiating manganese ores containing manganese carbonates, iron and alkaline earth metal compounds and insoluble compounds which comprises roasting the ore with ammonium chloride to form soluble chlorides of manganese, iron and alkaline earth metals, resulting in the evolution of ammonia and carbon dioxide gases, separating the soluble chlorides from the insoluble residue, adding manganese carbonate ore to said chloride solution to form insoluble iron hydroxide, precipitating therefrom a beneficial and relatively pure manganese hydroxide with ammonium hydroxide derived from the said ammonia gases, separating and treating the soluble alkaline earth metal chlorides with ammonium carbonate derived from the said ammonia and carbon dioxide gases to form insoluble alkaline earth metal carbonates and to reform ammonium chloride in solution and separating and evaporating said solution to recover the ammonium chloride in the original state in order to repeat the cycle.

6. The process of recovering manganese compounds from ores of the class consisting of manganese carbonates and oxides containing other soluble and insoluble compounds which comprises roasting the ore with ammonium chloride to form soluble manganese chloride, resulting in the evolution of ammonia gases, separating the soluble manganese chloride from the insoluble residue, precipitating from the solution an insoluble manganese compound with an ammonium compound derived from said ammonia gases thereby reforming the ammonium chloride in solution and separating and evaporating said solution to recover the ammonium chloride in the original state in order to repeat the cycle.

7. The process of recovering manganese compounds from ores of the class consisting of manganese carbonates and oxides containing iron compounds and insoluble compounds which comprises roasting the ore with ammonium chloride to form soluble manganese and iron chlorides, resulting in the evolution of ammonia gases, separating the soluble manganese and iron chlorides from the insoluble residue, adding additional manganese ore to form insoluble iron hydroxide and additional soluble manganese chloride, separating the soluble manganese chloride from the insoluble iron hydroxide, precipitating from the solution an insoluble manganese compound with an ammonium compound derived from said ammonia gases thereby reforming the ammonium chloride in solution and separating and evaporating said solution to recover the ammonium chloride in the original state in order to repeat the cycle.

8. The process of recovering manganese compounds from ores of the class consisting of manganese carbonates and oxides containing other soluble and insoluble compounds which comprises roasting the ore with ammonium chloride to form soluble manganese chloride, resulting in the evolution of ammonia gases, separating the soluble manganese chloride from the insoluble residue, precipitating from the solution an insoluble manganese compound, separating said insoluble manganese compound from the remaining soluble chlorides, treating said remaining soluble chlorides with an ammonium compound derived from said ammonia gases thereby reforming the ammonium chloride in solution and separating and evaporating said solution to recover the ammonium chloride in the original state in order to repeat the cycle.

9. The process of recovering manganese compounds from ores containing manganese carbonates which comprises roasting the ore with ammonium chloride forming soluble manganese chloride, resulting in the evolution of ammonia and carbon dioxide gases, separating the soluble manganese chloride from the insoluble residue, precipitating from the solution an insoluble manganese compound, separating said insoluble manganese compound from the remaining soluble chlorides, treating said remaining soluble chloride with ammonium carbonate derived from said ammonia and carbon dioxide gases thereby reforming the ammonium chloride in solution and separating and evaporating said solution to recover the ammonium chloride in the original state in order to repeat the cycle.

10. The process of recovering manganese values from ores of the class consisting of oxides and carbonates of manganese containing appreciable manganese values, iron compounds and insoluble compounds which comprises roasting the ore with ammonium chloride to form manganese chloride resulting in the evolution of gases comprising ammonia, controlling the roasting temperature to convert the iron compounds into insoluble iron oxide without substantial decomposition of the manganese chloride, water-leaching the roasted mixture to separate the soluble manganese chloride from the insoluble residue and precipitating manganese values from the manganese chloride solution.

11. The process of recovering manganese values from ores of the class consisting of oxides and carbonates of manganese containing appreciable manganese values, iron compounds and insoluble compounds which comprises roasting the ore with ammonium chloride to form manganese chloride resulting in the evolution of gases comprising ammonia, controlling the roasting temperature to convert the iron compounds into insoluble iron oxide without substantial decomposition of the manganese chloride, water-leaching the roasted mixture to separate the soluble manganese chloride from the insoluble residue, reacting said solution of manganese chloride with an ammonium compound obtained from said evolved gases thereby reforming ammonium chloride solution and separating and evaporating said solution to recover ammonium chloride in the original state in order to repeat the cycle.

12. The process of recovering manganese compounds from ores containing appreciable amounts of manganese oxides which comprises roasting the ore with ammonium chloride to form soluble manganese chloride resulting in the evolution of ammonia gases, separating the soluble manganese chloride from the insoluble residue, precipitating insoluble manganese hydroxide with ammonium hydroxide derived from the said ammonia gases thereby reforming ammonium chloride in solution and separating and evaporating said solution to recover ammonium chloride in the original state in order to repeat the cycle.

ANDREW T. SWEET.
JOHN D. MacCARTHY.